(12) United States Patent
Derbez et al.

(10) Patent No.: US 8,354,957 B2
(45) Date of Patent: Jan. 15, 2013

(54) AUTONOMOUS ORBIT PROPAGATION SYSTEM AND METHOD

(75) Inventors: Eric Derbez, Vancouver (CA); Guylain Roy-Machabee, Vancouver (CA); Dave Cayer, Vancouver (CA)

(73) Assignee: RX Networks Inc., Vancouver (CA)

( * ) Notice: Subject to any disclaimer, the term of this patent is extended or adjusted under 35 U.S.C. 154(b) by 0 days.

(21) Appl. No.: 13/357,601

(22) Filed: Jan. 24, 2012

(65) Prior Publication Data

US 2012/0127031 A1 May 24, 2012

Related U.S. Application Data

(63) Continuation of application No. 12/361,450, filed on Jan. 28, 2009, now Pat. No. 8,125,382, which is a continuation-in-part of application No. 11/740,206, filed on Apr. 25, 2007, now Pat. No. 7,612,712, and a continuation of application No. PCT/CA2008/001984, filed on Nov. 7, 2008.

(60) Provisional application No. 60/745,593, filed on Apr. 25, 2006, provisional application No. 60/986,972, filed on Nov. 9, 2007.

(51) Int. Cl.
*G01S 19/27* (2010.01)
*G01S 19/25* (2010.01)

(52) U.S. Cl. .............................. 342/357.66; 342/357.64

(58) Field of Classification Search ............. 342/357.66, 342/357.42, 357.64

See application file for complete search history.

(56) References Cited

U.S. PATENT DOCUMENTS

| | | | |
|---|---|---|---|
| 5,689,270 | A | 11/1997 | Kelley et al. |
| 5,774,829 | A | 6/1998 | Cisneros et al. |
| 5,909,381 | A | 6/1999 | Shome |
| 6,018,313 | A | 1/2000 | Engelmayer et al. |
| 6,035,202 | A | 3/2000 | Camp, Jr. |
| 6,133,872 | A | 10/2000 | Mitchell et al. |
| 6,219,385 | B1 | 4/2001 | Weinberg |
| 6,236,365 | B1 | 5/2001 | LeBlanc et al. |
| 6,304,216 | B1 | 10/2001 | Gronemeyer |
| 6,313,787 | B1 | 11/2001 | King et al. |
| 6,389,291 | B1 | 5/2002 | Pande et al. |
| 6,417,801 | B1 | 7/2002 | Van Diggelen |
| 6,519,466 | B2 | 2/2003 | Pande et al. |

(Continued)

FOREIGN PATENT DOCUMENTS

JP 2003021672 1/2003

(Continued)

OTHER PUBLICATIONS

Office Action, issued in U.S. Appl. No. 11/740,206, mailed Mar. 13, 2009, 6 pages.

(Continued)

*Primary Examiner* — Jack W Keith
*Assistant Examiner* — Fred H Mull
(74) *Attorney, Agent, or Firm* — Seed IP Law Group PLLC

(57) ABSTRACT

A method of predicting a location of a satellite is provided wherein the GPS device, based on previously received information about the position of a satellite, such as an ephemeris, generates a correction acceleration of the satellite that can be used to predict the position of the satellite outside of the time frame in which the previously received information was valid. The calculations can be performed entirely on the GPS device, and do not require assistance from a server. However, if assistance from a server is available to the GPS device, the assistance information can be used to increase the accuracy of the predicted position.

20 Claims, 9 Drawing Sheets

U.S. PATENT DOCUMENTS

| | | |
|---|---|---|
| 6,542,820 B2 | 4/2003 | LaMance et al. |
| 6,560,534 B2 | 5/2003 | Abraham et al. |
| 6,590,527 B2 | 7/2003 | Mutoh et al. |
| 6,606,346 B2 | 8/2003 | Abraham et al. |
| 6,651,000 B2 | 11/2003 | Van Diggelen et al. |
| 6,703,972 B2 | 3/2004 | Van Diggelen et al. |
| 6,704,651 B2 | 3/2004 | Van Diggelen |
| 6,708,116 B2 | 3/2004 | Wright |
| 6,735,523 B1 | 5/2004 | Lin et al. |
| 6,829,535 B2 | 12/2004 | Van Diggelen et al. |
| 6,907,224 B2 | 6/2005 | Younis |
| 6,915,208 B2 | 7/2005 | Garin et al. |
| 6,917,330 B2 | 7/2005 | Ohmura et al. |
| 6,937,187 B2 | 8/2005 | Van Diggelen et al. |
| 7,009,555 B2 | 3/2006 | Tsujimoto et al. |
| 7,043,363 B2 | 5/2006 | Yamamoto et al. |
| 7,091,904 B2 | 8/2006 | Vantalon et al. |
| 7,132,980 B2 | 11/2006 | Bloebaum et al. |
| 7,158,080 B2 | 1/2007 | Van Diggelen |
| 7,302,225 B2 | 11/2007 | Younis |
| 2002/0005802 A1 | 1/2002 | Bryant et al. |
| 2005/0140545 A1 | 6/2005 | Subbarao et al. |
| 2005/0231423 A1 | 10/2005 | Han et al. |
| 2006/0038719 A1 | 2/2006 | Pande et al. |
| 2006/0181452 A1 | 8/2006 | King et al. |
| 2006/0195262 A1 | 8/2006 | Draganov |
| 2006/0282216 A1 | 12/2006 | Robbins |
| 2007/0159387 A1 | 7/2007 | Syrjarinne et al. |
| 2007/0273581 A1 | 11/2007 | Garrison et al. |
| 2008/0018527 A1 | 1/2008 | LaMance et al. |
| 2008/0111738 A1 | 5/2008 | Han |
| 2008/0129593 A1 | 6/2008 | Garrin et al. |
| 2008/0180320 A1 | 7/2008 | Tysowski |
| 2008/0284646 A1 | 11/2008 | Walley et al. |
| 2008/0291086 A1 | 11/2008 | Walley et al. |
| 2008/0311870 A1 | 12/2008 | Walley et al. |

FOREIGN PATENT DOCUMENTS

| | | |
|---|---|---|
| WO | 2008055223 | 5/2008 |

OTHER PUBLICATIONS

Notice of Allowance, issued in U.S. Appl. No. 11/740,206, mailed Sep. 8, 2009, 4 pages.

International Search Report, issued in International Patent Application No. PCT/CA2008/001984, mailed Feb. 24, 2009, 2 pages.

Written Opinion, issued in International Patent Application No. PCT/CA2008/001984, mailed Feb. 24, 2009, 4 pages.

International Preliminary Report on Patentability, issued in International Patent Application No. PCT/CA2008/001984, mailed May 11, 2010, 5 pages.

Montenbruck, O. et al., "Reduced Dynamic Orbit Determination using GPS Code and Carrier Measurements," Aerospace Science and Technology, Feb. 25, 2005, pp. 261-271, vol. 9.

Montenbruck, O. et al., "Satellite Orbits: Models, Methods, and Applications," Springer, 2000, Chapter 3, pp. 53-116; Chapter 8, pp. 257-291; and Chapter 9, pp. 293-318.

Office Action, issued in U.S. Appl. No. 12/361,450, mailed Nov. 26, 2010, 7 pages.

Office Action, issued in U.S. Appl. No. 12/361,450, mailed May 2, 2011, 12 pages.

Office Action, issued in U.S. Appl. No. 12/361,450, mailed Aug. 8, 2011, 5 pages.

Office Action, issued in U.S. Appl. No. 12/361,450, mailed Oct. 24, 2011, 5 pages.

| Parameter | # of Bits | Scale Factor | Units | Incl. |
|---|---|---|---|---|
| The following fields occur once per message | | | | |
| SeedID | | | | |
| Num_Sats_Total | | | | |
| The following fields occur once per satellite | | | | |
| SatID | | | | |
| *Orbit State Vectors* | | | | |
| SatPosition | | | | |
| SatVelocity | | | | |
| *Force Model Parameters* | | | | |
| Solar | | | | |
| Constant Empirical Acceleration Terms | | | | |
| N-Times/Rev Empirical Acceleration Terms | | | | |
| Time | | | | |
| Clock | | | | |
| Total (assuming 32 satellites) | | | | |

FIG. 2

| Parameter | # of Bits | Scale Factor | Units | incl. |
|---|---|---|---|---|
| Navigation Model Flow Control (once per message) | | | | |
| Num_Sats_Total | 6 | 1 | - | C |
| Satellite and Format Identification (once per satellite) | | | | |
| SatID | 6 | - | - | C |
| Satellite Status | 2 | - | Boolean | Z |
| Satellite Navigation Model and Associated Bits (once per satellite) | | | | |
| C/A or P on L2 | 2 | - | Boolean | Z |
| URA index | 4 | - | - | Z |
| SV Health | 6 | - | Boolean | Z |
| IODC | 10 | - | - | Z |
| L2 P Data Flag | 1 | - | Boolean | Z |
| SF 1 Reserved | 87 | - | - | Z |
| $T_{GD}$ | 8 | $2^{-31}$ | sec | C |
| $T_{OC}$ | 16 | $2^4$ | sec | C |
| $af_2$ | 8 | $2^{-55}$ | sec/sec² | C |
| $af_1$ | 16 | $2^{-43}$ | sec/sec | C |
| $af_0$ | 22 | $2^{-31}$ | sec | C |

Legend
- C: Set to constant from Seed
- P: Predicted field
- Z: Set to zero

From FIG. 3A

| | | | | |
|---|---|---|---|---|
| $C_{rs}$ | 16 | $2^{-5}$ | meters | Z |
| $\Delta n$ | 16 | $2^{-43}$ | semi-circles/sec | Z |
| $M_0$ | 32 | $2^{-31}$ | semi-circles | P |
| $C_{uc}$ | 16 | $2^{-29}$ | radians | Z |
| $e$ | 32 | $2^{-33}$ | - | P |
| $C_{us}$ | 16 | $2^{-29}$ | radians | Z |
| $(A)^{1/2}$ | 32 | $2^{-19}$ | meters$^{1/2}$ | P |
| $T_{oe}$ | 16 | $2^4$ | sec | P |
| Fit Interval Flag | 1 | - | Boolean | Z |
| AODO | 5 | 900 | sec | Z |
| $C_{ic}$ | 16 | $2^{-29}$ | radians | Z |
| OMEGA0 | 32 | $2^{-31}$ | semi-circles | P |
| $C_{is}$ | 16 | $2^{-29}$ | radians | Z |
| $\omega$ | 32 | $2^{-31}$ | semi-circles | P |
| $i_0$ | 32 | $2^{-31}$ | semi-circles | P |
| $C_{rc}$ | 16 | $2^{-5}$ | meters | Z |
| OMEGAdot | 24 | $2^{-43}$ | semi-circles/sec | Z |
| idot | 14 | $2^{-43}$ | semi-circles/sec | Z |

FIG. 3B ized by the property of the invention and the present invention and the property of the invention and the present invention and the property of the property of the invention and the property of the property of the property of the invention.
AUTONOMOUS ORBIT PROPAGATION SYSTEM AND METHOD

RELATED APPLICATIONS

This application is a continuation of U.S. patent application Ser. No. 12/361,450 filed Jan. 28, 2009, which is a continuation in part of U.S. patent application Ser. No. 11/740,206 filed Apr. 25, 2007, issued on Nov. 3, 2009 as U.S. Pat. No. 7,612,712, which claims priority from 60/745,593 filed Apr. 25, 2006 and a continuation of PCT patent application entitled AUTONOMOUS ORBIT PROPAGATION SYSTEM AND METHOD filed on Nov. 7, 2008, which claims priority from U.S. provisional application No. 60/986,972 filed Nov. 9, 2007.

FIELD OF THE INVENTION

This invention relates to methods and apparatus for predicting and using navigation satellite orbit position data, such as that provided by Global Positioning System (GPS) satellites, as well as other Global Navigation Satellite Systems (GNSS) and other satellite systems or combinations thereof.

BACKGROUND OF THE INVENTION

Satellite positioning and the prediction of satellite positions are used extensively for many applications, for example vehicle navigation systems and portable GPS devices. For example, in order to compute a position, GPS receivers on GPS devices require the positions of the GPS satellites at the time ranging signals (i.e. the time tag of a signal at the time it is transmitted from the satellite antenna). This satellite orbit information is provided by the satellites on a radio frequency (RF) data link in the form of a satellite position model. The model uses a set of orbital elements, known as the 'Ephemeris', which is valid for a limited time period, typically 4 hours, but may be used for as long as 6 hours. The GPS satellites broadcast the Ephemeris data on an RF data link, and a GPS receiver continuously monitors and demodulates this data stream to obtain the updated Ephemeris. Ephemeris transmitted from a satellite is known as "Broadcast Ephemeris".

The Ephemeris data is a mathematical orbit arc model that allows a GPS device to evaluate a set of equations, and obtain the satellite position at any time during the four to six hour model fit period. Although the model allows for the evaluation of the satellite position beyond the 4 to 6 hours of validity, the accuracy typically degrades to the level of about a kilometer within a day. For a more detailed description of GPS and the ephemeris model, see "Global Positioning System: Theory and Applications" edited by Parkinson and Spilker, Vol. 1, chapters 2 (signal structure), 4 (ephemeris model), and 9 (navigation solutions).

In the case of GPS, it typically takes about 18 to 30 seconds to demodulate a Broadcast Ephemeris received from a particular satellite in good observation conditions and if the Ephemeris is demodulated on a first pass. Jamming and/or attenuated RF environments, such as urban environments or indoor locations, make demodulation spotty or difficult. This impacts the user experience by incurring a Time-To-First-Fix (TTFF) of 45 seconds or longer (there is a possibility of no fix at all), and battery life of the GPS device may be shortened. The TTFF is the time required for a GPS device to acquire satellite signals and navigation data, and calculate a position solution. For a cold start of a GPS device the TTFF can be over 15 minutes. In some cases GPS signals are too weak to faithfully demodulate navigation data, yet they are strong enough to be tracked using the current generation of receivers. If these receivers are provided with an alternate source of Ephemeris, instead of relying on demodulation of the Broadcast Ephemeris, performance of the GPS device can be improved, and TTFF can be reduced to a few seconds, even under attenuated conditions, and battery life will be extended. The GPS device can also calculate a fix by using no Z count techniques, thereby increasing the use of the navigation device.

The technique of providing an alternative source of Ephemeris, besides the Broadcast Ephemeris, is generally referred to as Assisted-GPS (AGPS). There are several types of AGPS available, including Real-Time Assistance techniques and Synthetic Assistance (also known as Predictive or Extended Ephemeris) techniques. Real-Time Assistance techniques deliver actual Broadcast Ephemeris that is pre-collected from a network of fixed GPS reference stations that relay to a central data center all the current Broadcast Ephemeris received from every satellite in view at each reference station. This reference data (or Assistance) is transformed by an AGPS server into a format that can be delivered to the GPS device over a communications network connection.

Rather than collect and relay real Broadcast Ephemeris data in real-time, Synthetic Assistance techniques use an AGPS server to predict or synthesize satellite position data (or Assistance) days or weeks into the future and deliver this non-real time, Synthetic Assistance data to GPS devices over a communications network connection or a direct connection with a host, such as a personal computer. An important limitation of the AGPS techniques discussed above is that they require some form of connection, network or direct, to a server, to download Assistance data to the GPS device.

Some GPS devices lack external connection capability, network or otherwise, and in some cases, a connection-capable device may be unable to establish a connection for a long period of time to a server. Under these conditions, GPS devices cannot use the AGPS techniques mentioned above and performance is impacted. Additionally, devices using Real-Time Assistance techniques consume network resources when downloading the Assistance. If the Broadcast Ephemeris validity period is extendable for a longer period of time, beyond the normal 4 to 6 hour window, network overhead could be reduced and TTFF performance improved for most GPS device use cases. The GPS industry has shown some efforts to extend the usability period of Broadcast Ephemeris by attempting to directly predict the future values of the various Keplerian terms of the Broadcast Ephemeris model. However, operating within the Keplerian model severely limits the ability of a GPS device to reliably predict these values beyond a day or so.

Another technique to provide AGPS Assistance is disclosed in U.S. patent application Ser. No. 11/740,206 for a "Distributed Orbit Modeling and Propagation Method for a Predicted and Real-Time Assisted GPS System". In this system, the GPS device, i.e. the client, predicts the Synthetic Assistance data itself, but does so after periodic receipt of enabling data (called "Seed Data") from a remote server.

Precise orbit modeling is known in the art. Predicting, i.e. propagating the position and velocities of satellites to future points in time is a function of analyzing current and/or past real Orbit State Vector samples, combined with a choice of specific force models that affect orbit trajectories. Typical orbit modeling considerations include the effects of a wide variety of force models, including those of the sun, moon and the earth. The software implementation of such orbit models is typically in the form of a Integrator which, using current and/or prior real Orbit State Vector samples, can propagate these to future points in time. Due to the CPU-intensive nature of evaluating the force models and tying the force models into a common reference frame, this code is made for operation on server-class computers.

The prior art techniques do not provide a GPS device the ability to propagate orbital information with the required accuracy for position computation. The prior art associated with providing Ephemeris data to the GPS device has been constrained to the Keplerian mathematical model used in the Broadcast Ephemeris data received from the satellite. To provide Assistance, the prior art requires a server to generate Assistance information and that the GPS device have some form of network connection for receiving the Assistance. The prior art does not enable a GPS device to use Broadcast Ephemeris as direct input to synthesize its own assistance data.

SUMMARY OF THE INVENTION

The invention proposes a new Assistance data generation method to address the limitations of Real-Time and Synthetic AGPS techniques, whereby the Assistance data is generated by the GPS device, also referred to as the "client", itself. All aspects related to the prediction aro may be performed within the GPS device itself, which uses an orbit model representation rather than a Keplerian model representation. According to the invention, the client is able to operate fully autonomously, without an available connection, by generating its own Seed Data to drive a Synthetic Assistance data prediction process.

The invention, through use of a choice of force models coefficients and observations, provides a GPS device version of a Propagator that can be implemented to yield orbit propagations which, once converted back into a Keplerian model, yield Synthetic Assistance Data for the generation of Broadcast Ephemeris, with effectively higher accuracy than if the prediction had been purely performed in the Keplerian domain.

A key feature of the invention is that it preserves the benefits of AGPS without the need for any connection to an AGPS server to download Assistance Data. The GPS device will have previously acquired and stored Ephemeris data at different time intervals through available means (from Broadcast Ephemeris, or AGPS techniques). In the case where a network connection or AGPS is not available, the GPS device collects Broadcast Ephemeris data over time. The GPS device uses these observations, or Real-Time assistance data provided through a AGPS server, as input to an orbit propagation model to predict and synthesize accurate Assistance data past the expiration time of the originally received Broadcast Ephemeris. This locally generated synthetic Assistance data, whether in the form of propagated orbits or actual Ephemeris, can be provided for as long into the future as the orbit can be reliably predicted. Typically, this prediction period is between 1 and 3 days if Broadcast Ephemeris data observations are used as input to the orbit propagation model, and up to several weeks if used in conjunction with Synthetic Assistance data from an AGPS server. Longer prediction periods are possible depending on the accuracy degradation tolerated. Although the GPS device will initially start up without assistance, the self-generated Assistance data will enable subsequent rapid TTFF. Also, the GPS receiver's sensitivity can be better exploited for subsequent start ups as long as the GPS device can periodically acquire Broadcast Ephemeris or Assistance data at regular intervals.

The invention includes an autonomous orbit propagation and self-assistance method for devices with satellite navigation or positioning capability in which:

a) Software runs on a GPS device. The software is capable of computing predicted navigation satellite orbit position data and then using the predicted navigation satellite orbit position data to accelerate and improve the position determination capabilities of the GPS device. All the prediction data processing functions may be limited to, and localized within, the GPS device.

b) Software or hardware modules are included on a GPS device to implement the functions of a Seed Generator, a Propagator, a Prediction Buffer and an AGPS Interface Agent, whether separately or jointly.

c) The Seed Generator module determines GPS satellite position and velocity, and of computing GPS satellite force model parameters based on local observations of real broadcast ephemeris over configurable intervals.

d) The Seed Generator module uses different GPS satellite force model parameters, such as solar pressure, constant acceleration and sinusoidal radial, cross-track and along-track terms, based on the available computing processor resources in the GPS device.

e) The Seed Generator module delivers the GPS satellite force model parameters and an initial GPS satellite position and velocity to a Propagator module running in the same GPS device.

f) The Propagator module generates, within the GPS device, a set of predicted Orbital State Vectors (OSV) comprising a satellite position and velocity. The Propagator does this by propagating the initial satellite position and velocity provided by the Seed Generator function to a different time than the time of the initial satellite position and velocity, using the GPS satellite force model parameters provided by the Seed Generator function. A compressed model for the orbit is then stored in the local Prediction Buffer 140 in the form of (for example) a set of polynomials, each with its own time tag.

g) A GPS position computing module is also provided onboard, for instance on a chipset or as a software function. The position computing module operates with assistance data derived from the Prediction Buffer 140 by mapping the data from the appropriate model to a format appropriate for the GPS computing module.

h) The Assistance data is derived on demand by converting the data in the appropriate Prediction Buffer 140 into the satellite navigation data model format, and is provided by an AGPS Interface Agent module to the onboard GPS position computing module at a time and in a format required by the onboard GPS position computing module.

An additional feature of the method and system according to the invention is that when an external connection capability is available in a GPS device, the Seed Generator module is capable of determining GPS satellite position and velocity, and is also capable of computing GPS satellite force model parameters based on local observations of real broadcast ephemeris as well as remote synthetic or real-time sources of GPS assistance data over configurable intervals.

An additional feature of the method is that when an external connection capability is available,0 the initial satellite position and velocity and the GPS satellite force model parameters may be computed by a remote Seed Server and provided to the Propagator over a network or direct connection.

An additional feature of the method is that the Seed Generator module may compute GPS satellite force model parameters using a plurality of GPS satellite force models. The Propagator module generates predicted orbit state vectors (of position and velocity) by propagating initial satellite position and velocity provided by the Seed Generator module.

An additional feature of the method is that the remote Seed Server module computes GPS satellite force model parameters using a plurality of GPS satellite force models, and the Propagator function generates orbit predictions by propagating the initial satellite position and velocity and correction terms provided by the remote Seed Server using more accurate force models.

An additional feature of the method is that the Propagator is provided with a plurality of satellite position and velocity and correction terms by the Seed Generator.

An additional feature of the method is that the Propagator is provided with a plurality of satellite position and velocity and correction terms by the remote Seed Server.

An additional feature of the method is that it can be implemented so that the software modules run either in the host device processor, in the onboard GPS position computing element processor, or in both.

An additional feature of the method is that the satellite navigation or positioning device is either a mobile or fixed device.

An additional feature of the method is that the software modules can be run on a device that does not have an onboard GPS position computing element.

A method of predicting a location of a satellite is provided, including the steps of: (a) providing a GPS device, the GPS device having an a RF antenna configured to receive a plurality of positions and a velocity associated with a satellite, the plurality of positions and velocity valid for an effective time period; (b) the GPS device calculating, from the plurality of positions and the velocity, a correction acceleration of the satellite; (c) the GPS device propagating an orbit of the satellite within a predicted time period using the plurality of positions, the velocity and the correction acceleration, at least a portion of the predicted time period occurring after the effective time period; and (d) the GPS device determining the location of the satellite using the orbit. The plurality of positions and the velocity may be received within an ephemeris, such as a broadcast ephemeris.

A software module on the GPS device may generate force model coefficients and Orbit State Vectors using the ephemeris. A propagation software module on the GPS device may calculate the orbit. After the orbit is propagated, it is stored as a polynomial within a memory of said GPS device. The orbit may be converted into a synthetic ephemeris for use by the GPS device to determine the location of the satellite after the effective time period. The GPS device may also have a network interface, and if the network interface is in communication with an AGPS server, the AGPS server may provide assistance to the GPS device in determining said location of the satellite; or the AGPS server may communicate seed data to the propagation module; or a synthetic ephemeris to the GPS device.

A GPS device is provided, including: a) an RF receiver configured to receive a communication of a plurality of positions and a velocity associated with a satellite, the plurality of positions and velocity valid for an effective time period; b) a digital signal processor configured to demodulate the communication; c) a seed generator configured to calculate, from the plurality of positions and the velocity, a correction acceleration of the satellite; and d) a propagator configured to propagate an orbit of the satellite within a predicted time period using the plurality of positions, the velocity and the correction acceleration, at least a portion of the predicted time period occurring after the effective time period.

The plurality of positions and the velocity may be received within an ephemeris, such as a broadcast ephemeris. The said seed generator may be further configured to generate force model coefficients and Orbit State Vectors using the ephemeris. The GPS device may also have a memory to store the orbit, after the orbit is propagated. The GPS may also have an AGPS interface module configured to convert the orbit into a synthetic ephemeris to determine the location of the satellite after the effective time period. The GPS device may also have a network interface configured to communicate with an AGPS server, and to receive assistance from the AGPS server. In such a case, the propagation module may be configured to receive seed data from the AGPS server or the GPS device may have a network interface configured to receive a synthetic ephemeris from an AGPS server.

A method of predicting a location of a satellite is provided, comprising the steps of: (a) providing a device with GNSS capability, the device having an a RF antenna configured to receive a plurality of positions and a velocity associated with a satellite, the plurality of positions and velocity valid for an effective time period; (b) the device calculating, from the plurality of positions and the velocity, a correction acceleration of the satellite; (c) the device propagating an orbit of the satellite within a predicted time period using the plurality of positions, the velocity and the correction acceleration, at least a portion of the predicted time period occurring after the effective time period; and (d) the device determining the location of the satellite using the orbit.

BRIEF DESCRIPTION OF THE FIGURES

FIG. 2 is a table showing a representation of a Seed Data structure according to the invention;

FIG. 3A and 3B is a table showing a representation of a Synthetic Assistance data record structure according to the invention;

DETAILED DESCRIPTION OF THE INVENTION

Figure 1:
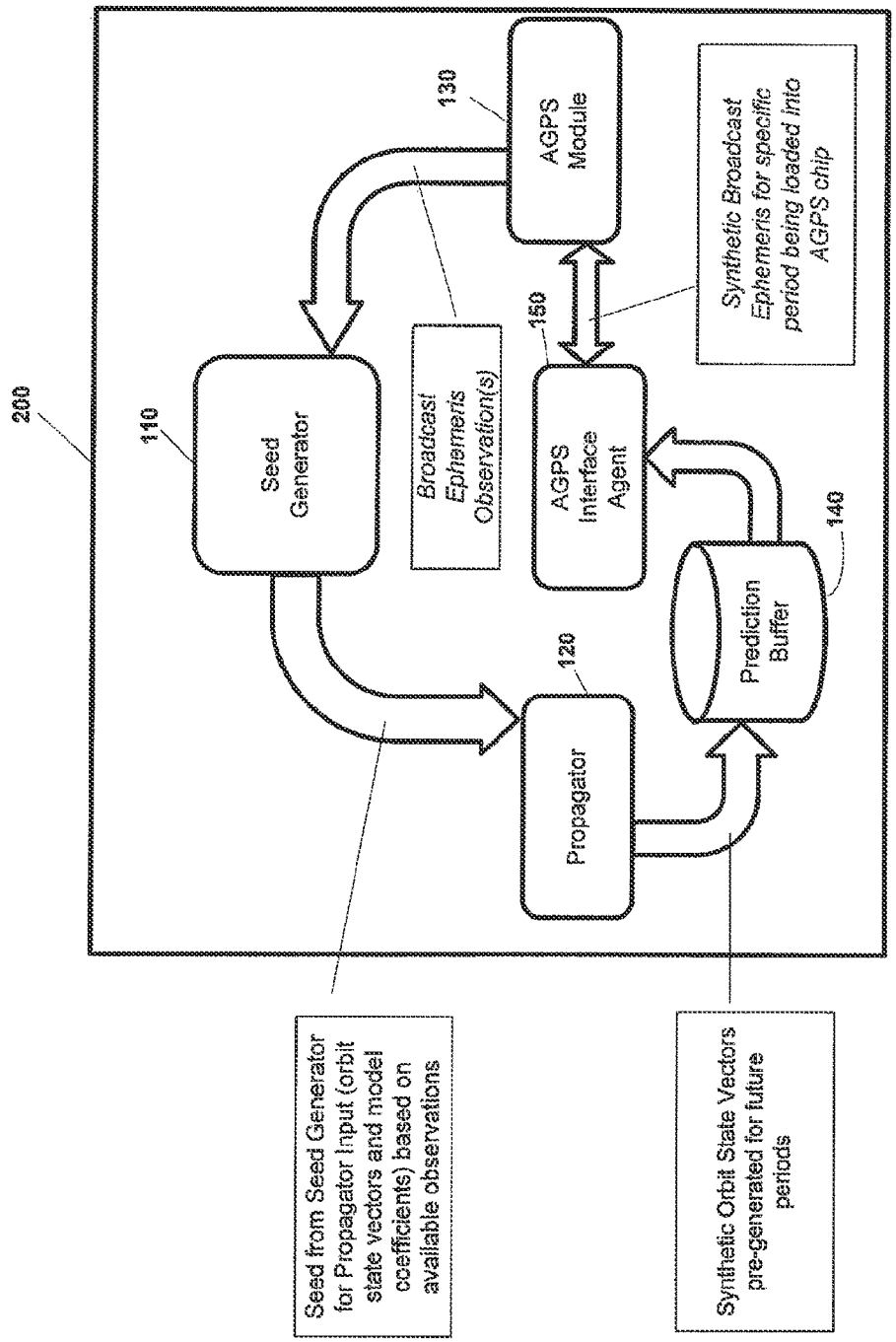
FIG. 1 is a block diagram showing a self assisted GPS architecture according to the invention.

In this document, the following terms have the following meanings:

"AGPS Interface Agent" means a software or hardware module for converting a Prediction Buffer to a synthetic ephemeris in a format acceptable to an AGPS Module;

"AGPS Module" means a software or hardware module, such as a chipset, for managing input to a GPS device, such as real or synthetic ephemeris, or time frequency and an estimated satellite position;

"AGPS Server" means a server generating Assistance for use by a Seed Generator or Propagator on a GPS device in communication with the AGPS Server;

"GPS device" means an object having a GPS receiver and associated digital processor for receiving and processing signals from GPS satellites. A GPS device may be handheld, or may be part of a larger structure, such as a vehicle;

"Orbit State Vector" means a vector containing information about the position, and velocity of a satellite at a given epoch;

"Propagator" means a hardware or software module for calculating an Orbit State Vector using Seed Data as input;

"Prediction Buffer" means a memory for storing a set of predicted models which parameterize the satellite orbit arcs for each interval "Seed Generator" means a software or hardware module that calculates Seed Data for use by a Propagator from a plurality of time tagged satellite positions and a velocity, such as an ephemeris;

"Seed Data" means a set of coefficients corresponding to force models and an initial state vector for predicting the location of a satellite;

"Seed Server" means an AGPS server generating Seed Data for use by a Propagator on a GPS device in communication with the Seed Server; and "Synthetic Ephemeris" means an ephemeris generated from a predicted Orbit State Vector, rather than received directly from a satellite.

While the present invention is discussed in this document in terms of a GPS device, other GNSS may be used with the system and method disclosed herein.

The present invention uses GPS or other Global Navigation Satellite System Broadcast Ephemeris observations to generate (using Seed Generator 110) an input to an orbit propagation modeler, referred to as Propagator 120, in GPS device 200. Propagator 120 can then predict or synthesize Assistance data for use in predicting the future location of the satellite. The accuracy of the predictions is limited by the number and interval of observations used by Seed Generator 110, the fidelity of Propagator 120 implemented within GPS device 200, the inability to precisely model the forces acting on the GPS satellites, and the accuracy of the initial position and velocity used in Propagator 120. Propagator 120 uses earth, lunar and solar gravity as well as solar pressure force models. The solar pressure force model is the only GPS constellation dependent force as different satellite types have different masses and are affected differently by the effects of photons impinging on their surfaces, and therefore different models are needed for different satellites. For the purposes of this invention, other than solar pressure models as described above, the methods described apply equally to other GPS constellations. Orbit determination and prediction techniques are known in the art, for example see "Methods of Orbit Determination," by Escobal, for further details.

Figure 5:
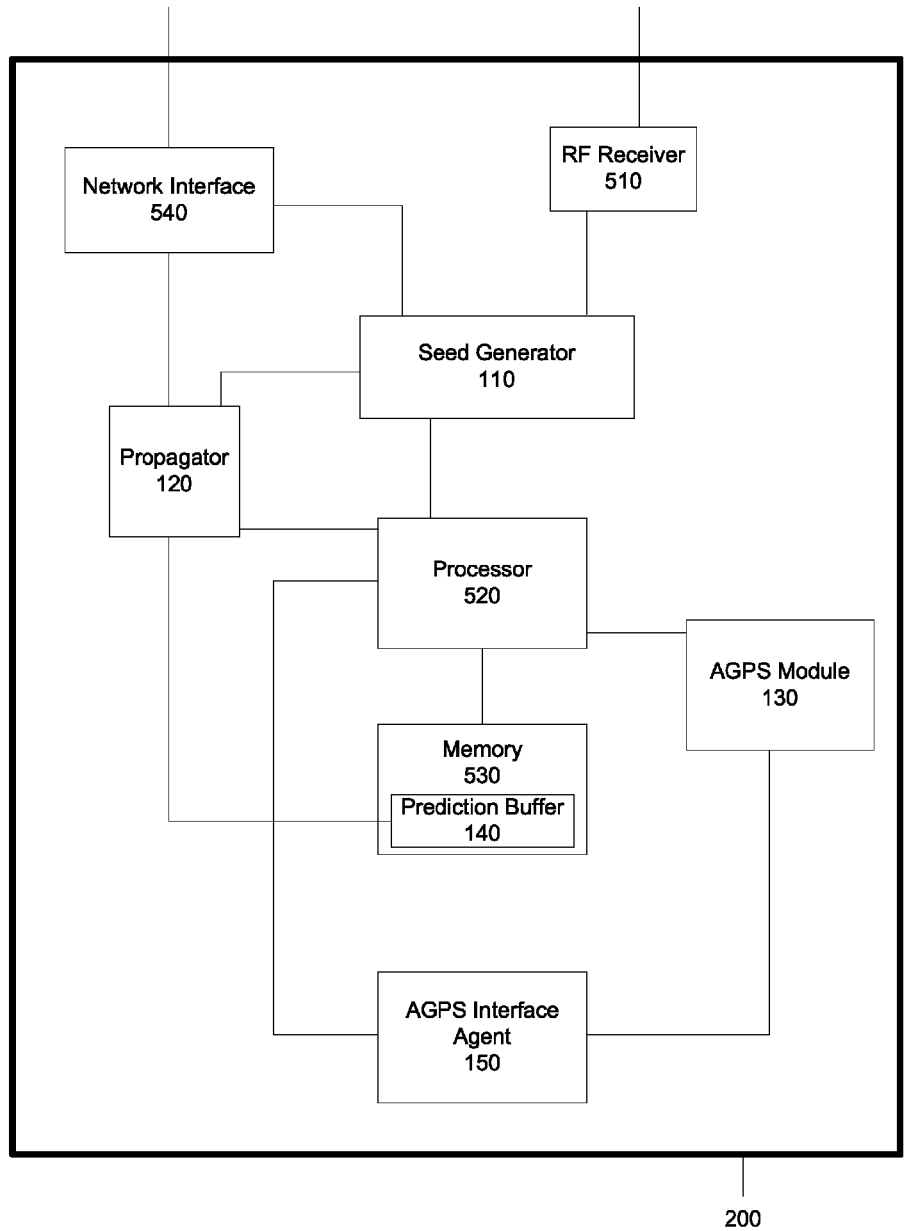
FIG. 5 is a block diagram of a GPS device according to the invention.

The present invention places responsibility for orbit prediction on Seed Generator 110 and Propagator 120, both of which housed within GPS device 200, as seen in FIG. 5. GPS device 200 also includes RF Receiver 510 (and associated digital signal processor), AGPS Module 130, AGPS Interface Agent 150, Processor 520, and Memory 530 (which includes Prediction Buffer 140). GPS device may also have a network interface 540, for communications with AGPS Server 180. Seed Generator 110 may use a single Broadcast Ephemeris reading, or up to any number of subsequent Broadcast Ephemeris readings to generate a Seed Data, which is then used as input to Propagator 120 to generate Orbit State Vectors. The general architecture of this system is shown in FIG. 1.

Figure 6:
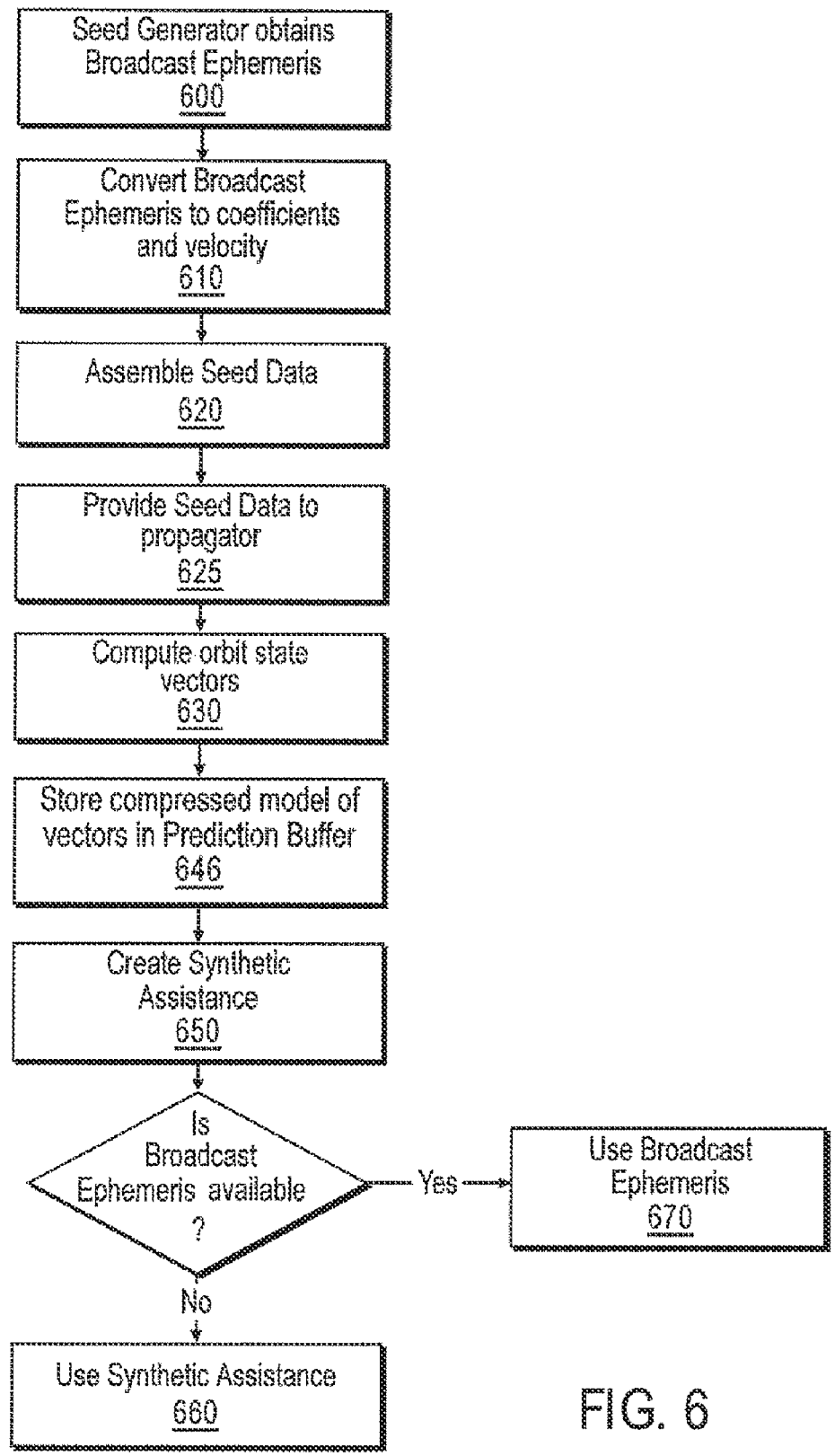
FIG. 6 is a flow chart showing the process by which a GPS device propagates an orbit propagation model according to the invention.

In a fully autonomous mode, i.e. in a case where the GPS device has no external connection capability, such as network interface 540, or the GPS device has network interface 540, but is unable to connect with AGPS Server 180, the basic steps of the method are as follows (as illustrated in FIG. 6):

1. When GPS device 200 is powered on and AGPS chipset 130 demodulates Broadcast Ephemeris data from an RF signal, Seed Generator 110 is provided with copies of this Broadcast Ephemeris on specific, configurable intervals (e.g. once every 6 hours, or every 12 hours, etc. . . . ) (step 600).

2. Seed Generator 110 converts these Broadcast Ephemeris observations from their Keplerian model representation to their current applicable orbital representation (i.e. position, velocities) and begins computing a set of force model coefficients based on real observations that will best match future satellite orbit positions and velocities predictions (step 610). Seed Generator 110 assembles this into a Seed Data, including Orbit State Vectors and resulting force model coefficients (step 620).

3. The Seed Data is provided to Propagator 120 (step 625). Propagator 120 then computes Orbit State Vectors for each satellite vehicle included in the Seed Data (step 630). The Orbit State Vectors can be computed on any given interval, for example 15 minute epochs. Propagator 120 performs this computation as a background task in GPS device 200, and stores the resulting prediction data in Prediction Buffer 140 as a polynomial, such as a 10th order polynomial representing a four hour time frame, from which an orbit state vector can be easily computed (step 640). Prediction Buffer 140 can be sized to store polynomials of any desired duration, but is typically sized for the expected accuracy or validity of the prediction, i.e. up to 3 or 4 days ahead. Prediction Buffer 140 is typically implemented in non-volatile memory such that the data it contains can be immediately used when GPS device 200 is next powered-up.

4. On a configurable interval, typically every 15 minutes or when AGPS module 130 requires assistance data, for example when the error tolerance has been exceeded, AGPS Interface Agent 150 retrieves the applicable polynomial, converts it into an orbit state vector for the current time, then converts it back to its equivalent Broadcast Ephemeris Keplerian data format, and injects the resulting Synthetic Assistance data back into AGPS module 130 via the an interface (step 650). This Synthetic Assistance effectively contains a subset of the real Broadcast Ephemeris coefficients, and its ToE (Time of Ephemeris) is configurable, typically set to expire within 15 minutes.

5. AGPS module 130 then first uses the Synthetic Assistance if no valid real Broadcast Ephemeris is available for any given satellite (step 660), but replaces the Synthetic Assistance with real Broadcast Ephemeris as it is ultimately received and demodulated from the RF signal (step 670).

In general, as more Broadcast Ephemeris readings are taken, the Synthetic Assistance data becomes more accurate. The process starts by using a first known position and velocity from a Broadcast Ephemeris of a GPS Satellite as input to Seed Generator 110 and Propagator 120, which uses modeling of physical forces to allow for numerical integration to a second position from an observed Broadcast Ephemeris (or from a different source of Ephemeris e.g. from assistance if the GPS device has network interface 540). The initial velocity provided with the first position is scaled to pass to within a reasonable proximity of the second position. The sign and scaling of the velocity depends on the sign and magnitude of the radial error. For longer arcs, an initial velocity vector may have to be rotated along an axis perpendicular to the initial velocity vector and the orbital plane, but in any event there are only 2 degrees of freedom in the initial velocity: the magnitude and the rotation angle. As time progresses, multiple Broadcast Ephemeris readings can be taken and these readings used by Seed Generator 110 and Propagator 120 to improve the accuracy of the Seed Data over time. Multiple broadcast readings, from 1 to n (n being any integer) can be separated by any amount of time, but multiple readings over 12 or 24 hours are preferable to adjust the velocity vectors used by Seed Generator 110 and Propagator 120 to generate the Seed Data for the next few days.

Traditional orbit determination uses the most complete force models available to provide for the best orbit fit to the tracking data. Typically when more robust and accurate force models are used, the more accurate the resulting orbit determination. This robust and accurate set of force models provides accurate prediction of the satellite positions and velocities into future times beyond the measurement times of the tracking data. Force models may be of any level of complexity for the purposes of the system and method according to the invention, and Propagator 120 on GPS device 200 can use a subset of full and robust force models to reduce processor 520 loading.

To further increase the accuracy of the orbit prediction, generalized accelerations for unmodeled radial and along track acceleration can be adjusted by iteration so as to pass arbitrarily close to the target second point(s) by methods analogous to those used in texts such as Montenbruck and Gill, "Satellite Orbits: Models, Methods, and Applications". Cross track acceleration errors are well modeled and of minimal impact and hence do not need to be represented by a fictitious vector. While the range error of the Broadcast Ephemeris for GPS medium earth orbit satellites is typically less than three meters, there can be larger along track errors of about 12 meters in prediction. These along track errors (as seen in FIG. 8) together with radial errors (which are generally part of the ranging errors for terrestrial GPS devices) are modeled with fictitious accelerations.

Figure 8:
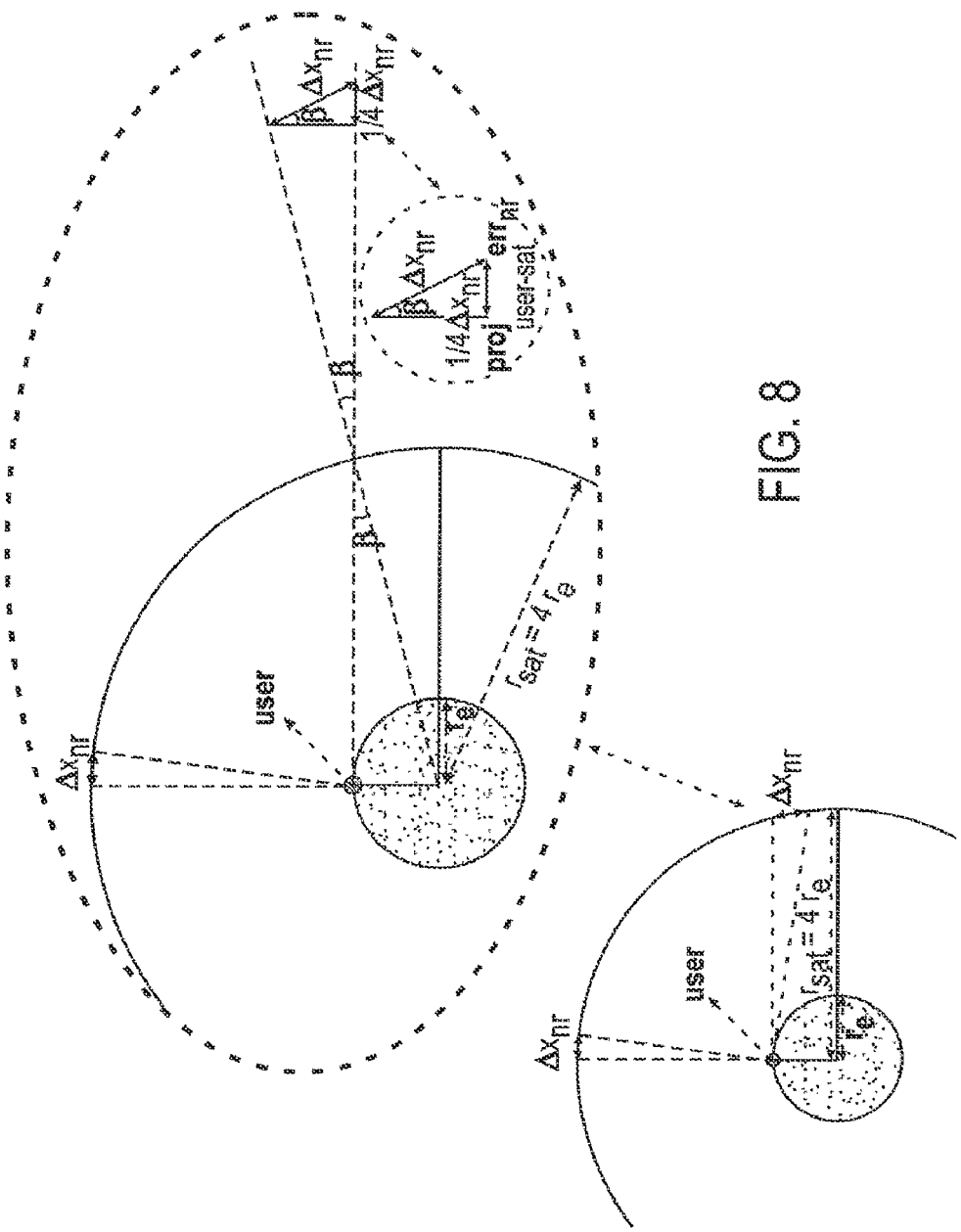
FIG. 8 shows the contribution of non radial component error in satellite orbit prediction.

FIG. 8 depicts the two extreme cases when a satellite (at four earth radii out) is directly overhead in which case non-radial errors do not impact the line of sight range error, and when the satellite is on the user's horizon, in which case, only a quarter of the non-radial errors project into the line of sight error.

Seed Generator 110 assembles a Seed Data that combines Orbit State Vectors with force model coefficients to be used by Propagator 120. The structure of a typical implementation of the Seed Data may look as shown in FIG. 2.

Once Seed Generator 110 has received at least one valid Broadcast Ephemeris, typically for the following 4 hours, Seed Generator 110 performs a process to optimize the accuracy of the orbital predictions from Propagator 120. At each step in the process, Seed Generator 110 estimates force model coefficients to calculate the worst radial and along-track errors with respect to the observed Broadcast Ephemeris. The output, the Seed Data, has a structure (as shown in FIG. 2) including the following coefficients:
  solar pressure:
    Cr[0] and Cr[1] (y-bias, and x-z component)
  constant acceleration terms:
    Along-track acceleration: aAccelConst,
    Cross-track acceleration: cAccelConst
    Radial acceleration: rAccelConst and a set of sinusoidal terms:
  Along-track: aAccelS[2], aAccelC[2] which has period 1,2 orbits
  Cross-track: cAccelS[2], cAccelC[2] which has period 2,4 orbits
  Radial: rAccelS[2], rAccelC[2] which has period 1,2 orbits Depending on the available computing resources in GPS device 200, Seed Generator 110 can compute some or all of the above coefficients. At a minimum however, the following coefficients are computed:
  constant acceleration terms:
    Along-track acceleration: aAccelConst,
  and sinusoidal terms:
    Radial: rAccelS[0], rAccelC[0]
    Along-track: aAccelS[0], aAccelC[0]

In addition, the time and clock parameters from Broadcast Ephemeris observations are included in the Seed Data.

The main steps of the process are as follows for a minimal form of Seed Data and related coefficients, expressed in Earth Centered Inertial terms:

1) Iteratively scale the initial velocity α (from the Broadcast Ephemeris), subject to the radial error in the $1^{st}$ six hours, to be less than a desired threshold, typically set at 5 meters. Once met, call this velocity $α_{opt}$ and move to next step.

2) Optimize the sinusoidal radial accelerations (period=1 orbit):
   a) Represent A cos(ωt)+B sin(ωt)=C cos (ωt+δ), i.e. ω's magnitude and phase. Let $C=1e^{-8}$ $ms^{-2}$. Calculate the main radial error with $C=1e^{-8}$ $ms^{-2}$ for different phases $δ_1 ... δ_m$ and retain the phase $δ_{opt}$ that minimizes the radial error.
   b) Using $δ_{opt}$ optimize over C to obtain the $C_{opt}$ that minimizes radial error.
   c) If the previously calculated worst case along-track error>threshold, apply along-track acceleration A, until a maximum number of iterations is reached, or until the worst case along-track error<desired threshold, at which time $A_{opt}$ is determined.

3) The force model coefficients $α_{opt}$, $δ_{opt}$, $C_{opt}$ and $A_{opt}$ are then incorporated alongside Orbit State Vectors as part of the Seed Data. When Propagator 120 uses the Seed Data, it can propagate orbits for each satellite by applying $α_{opt}$ to $V_0$, and $C_{opt}$ cos (ωt+$δ_{opt}$) and $A_{opt}$ in the radial and along-track part of the orbit.

The predicted Orbit State Vectors derived from polynomials stored in Prediction Buffer 140 are converted back to a Keplerian model by AGPS Interface Agent 150. This resulting Synthetic Assistance Data is then formatted to appear in the same format as the Broadcast Ephemeris navigation model data record before being fed into AGPS module 130, except that while a number of fields are predicted, the other non-predicted fields are either set to constants or zeros. A typical implementation might result in the Synthetic Assistance data record structure shown in FIG. 3 being fed into AGPS chipset 130, depending on the format AGPS chipset 130 is expecting or able to handle.

For example, with reference to FIG. 3, $af_1$ is taken from the most recent ephemeris and $af_0$ is the value of the clock corrections at the new $T_{oc}$, and the $T_{oc}$ parameter is set to equal the $T_{oe}$.

An advantage of the system and method according to the invention, is that the computational load on the GPS device is lightened. For example, the transformation of the lunar and solar accelerations into an earth centered earth fixed frame of reference is accomplished without the typical sequence of transformations WRNP (where W is the polar wander, R is the Greenwich Apparent Sidereal Angle, N is the nutation angle and P is precession). Typically, W is downloaded from the International Earth Rotation Service (or estimated), and R is corrected by a slowly changing bias between 'UT1' and UTC (again downloaded or estimated). The present invention however, does not need these corrections and simply uses R without estimating the UT1-UTC offset (currently ~14 sec); instead any ensuing errors are absorbed by the sinusoidal accelerations described above.

Other calculation methods which may be used include:
1. The use of polynomial models (that are valid for four days) to model solar/lunar ephemeris. These models can be ported to fixed point math for lunar/solar International Celestial Reference Service (ICRS) position calculations;
2. Determining the analytical equations for the partials of the radial and along track acceleration error with respect to once or twice per revolution radial and along track sinusoidal perturbations;
3. Determining the effect of a small change in the initial velocity on the radial and along track acceleration errors with respect to a given set of positions; and
4. Use a Glonass navigation message to propagate orbits past the 1 hour validity standard in the Glonass system. The Glonass navigation message quantizes the initial velocity to 24 bits and optimizes the calculation using a lower accuracy force model (than used in the present invention) resulting in an ephemeris valid for about one hour. To use the force models and GPS ephemeris format in the present invention, the Glonass broadcast position and velocity need only be mapped from the PZ90 reference ellipsoid to the WGS84 ellipsoid by means of a Helmert transformation (also known as a seven parameter transformation).

The Seed Data creation may be done in series on processor 520, however, the Seed Data may be generated in parallel using a small cache (such as 7 KB). If the Seed Data is generated in series, a larger cache (such as 48 KB) may be used.

A double caching technique may be used wherein each Seed Data stored in a buffer in memory 530 is over-written by a new Seed Data as the first Seed Data is being propagated; both seeds write into different blocks of the same Prediction Buffer 140 however. The input of a new ephemeris updates the clock in both sets of Seed Data in the buffers.

Figure 4:
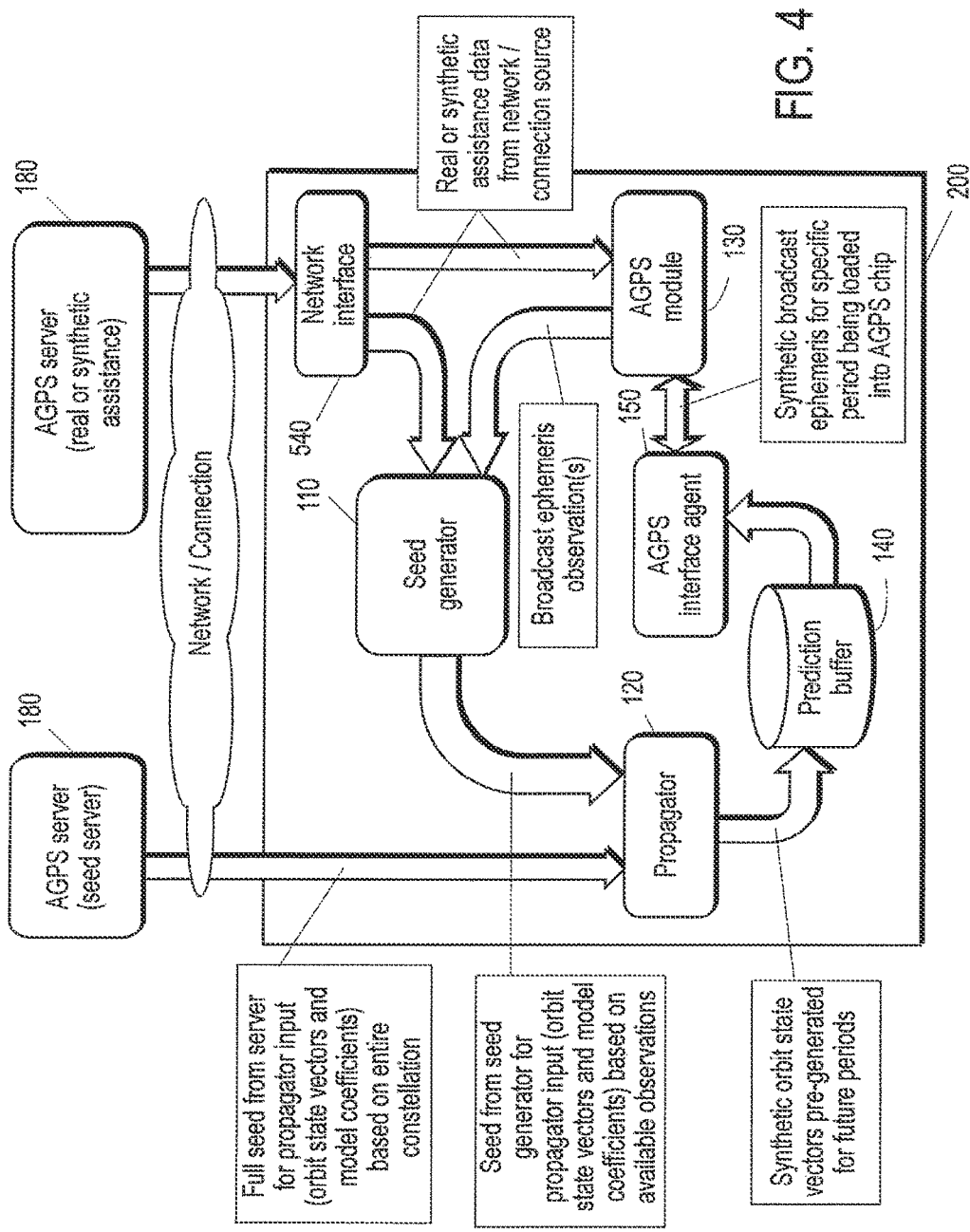
FIG. 4 is a block diagram showing a self assisted GPS architecture with access to a seed server.

In addition to using Broadcast Ephemeris as input to Propagator 120, the system also allows for Synthetic Assistance data generated at an AGPS server 180 and downloaded through a network connection to be used as input to Propagator 120. This embodiment is useful in environments where GPS device 200 cannot acquire Broadcast Ephemeris. Another advantage of using Real-Time or Synthetic Assistance data, if available, is that Ephemeris for the full satellite constellation can be made available to Propagator 120 at once, improving the performance of Propagator 120. The data downloaded from AGPS server 180 can be in several formats, enabling GPS device 200 to generate its own, long term accurate prediction data. The general architecture of this embodiment is shown in FIG. 4.

In the AGPS embodiment, the input options to Seed Generator 110 may be augmented to include either Real-Time or Synthetic Assistance Data from external AGPS Server 180. Such Assistance Data may provide a more complete view of the satellite constellation compared to the actual observations in the fully autonomous GPS device case, thereby enabling Seed Generator 110 to prepare Seed Data that applies to more satellite vehicles. If AGPS Server 180 is a Seed Server, as described in U.S. patent application Ser. No. 11/740,206 which is hereby incorporated by reference in its entirety, the Seed Data provided by AGPS Server 180 can also be used as input to Propagator 120. As the Seed Data from a Seed Server is generated on a more powerful processor and will be valid for a longer period (e.g. 7 days), the Seed Data will enable Propagator 120 to compute more accurate predictions than Seed Generator 110 on GPS device 200. However, if no new Assistance data is available from an AGPS Server 180, GPS device 200 can revert to Seed Generator 110 and continue operating in an autonomous mode. In this embodiment of the invention the viability and usability of any network-based Real-Time or Synthetic Assistance Data can be used if and when the data is available.

A GPS device range accuracy (URA) for an ephemeris, which takes into account the age of the clock and orbit accuracy, may be calculated by GPS device 200. The method used to calculate the URA will depend on whether the Seed Data is self generated by the GPS device 200 or received from an AGPS server 180. In the case of self generated Seed Data, the URA is a linear extrapolation of the maximum of the radial error, or ¼ of the non radial error, as seen in FIG. 8.

Figure 7:
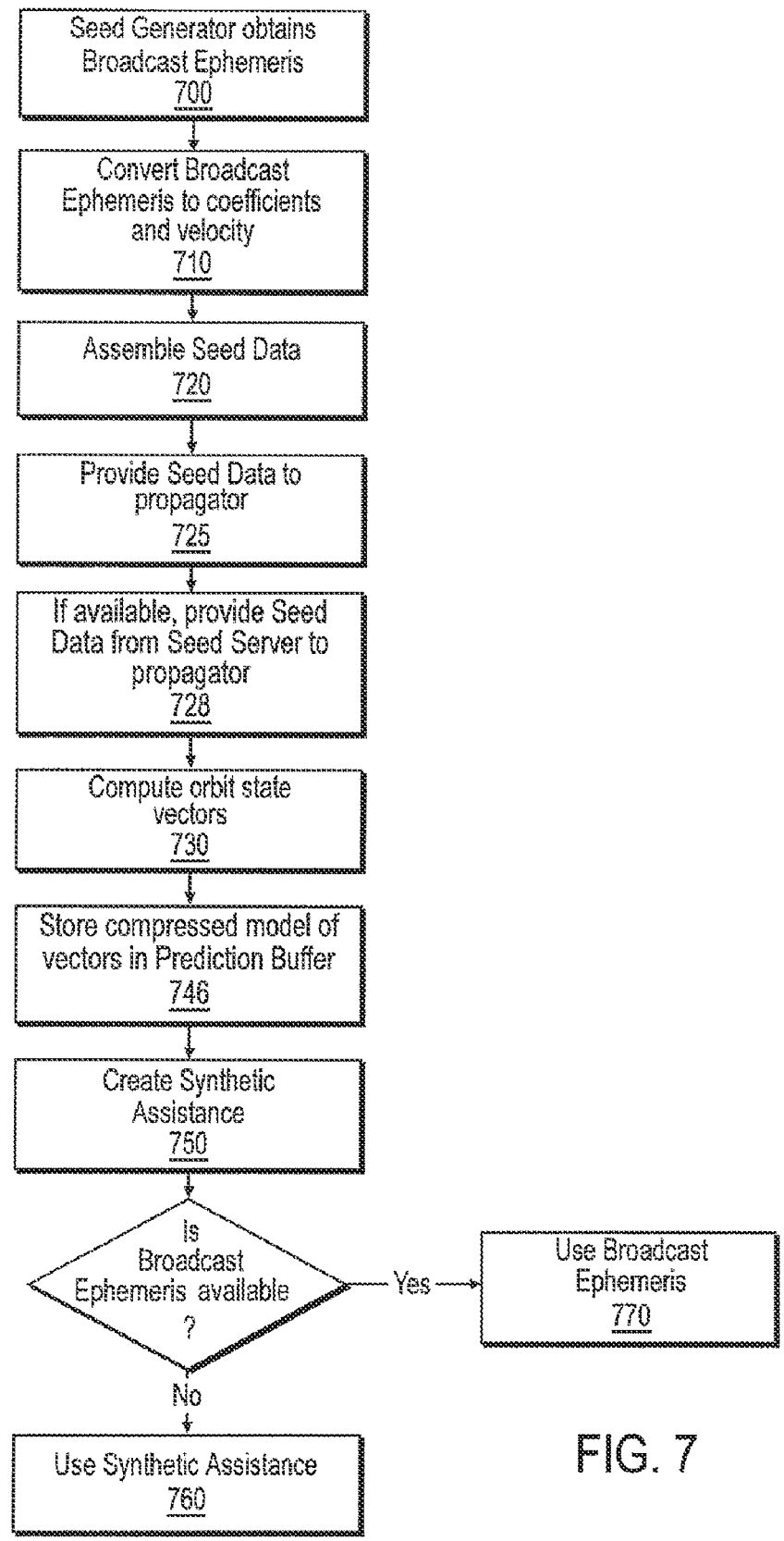
FIG. 7 is a flow chart showing the process by which a GPS device with access to a Seed Server propagates an orbit propagation model according to the invention.

The process whereby GPS device 200, uses AGPS Assistance from a Seed Server, is shown in FIG. 7, and includes the following steps:
1. When GPS device 200 is powered on and AGPS chipset 130 demodulates Broadcast Ephemeris data from an RF signal, Seed Generator 110 is provided with copies of this Broadcast Ephemeris, if it is available, on specific, configurable intervals (e.g. once every 6 hours, or every 12 hours, etc. . . . ) (step 700).
2. Seed Generator 110 converts these Broadcast Ephemeris observations from their Keplerian model representation to their current applicable orbital representation (i.e. position, velocities) and begins computing a set of force model coefficients based on real observations that will best match future satellite orbit positions and velocities predictions (step 710). Seed Generator 110 assembles this into a Seed Data, including Orbit State Vectors and resulting force model coefficients (step 720).
3. The Seed Data is provided to Propagator 120 (step 725). Seed Data from AGPS Server (if it is a Seed Server) is also provided to Propagator 120, if available (step 728). Propagator 120 then computes orbit state vectors for each satellite vehicle included in the Seed Data (step 730). The Orbit State Vectors can be computed for any time on any given interval, for example 15 minute epochs. Propagator 120 performs this computation as a background task in GPS device 200, and stores the resulting prediction data in Prediction Buffer 140 as polynomials that can be converted to Orbit State Vectors (step 740). Prediction Buffer 140 can be sized to store polynomials of any desired duration, but is typically sized for the expected accuracy or validity of the prediction, i.e. up to 3 or 4 days ahead. Prediction Buffer 140 is typically implemented in non-volatile memory such that the data it contains can be immediately used when GPS device 200 is next powered-up.
4. On a configurable interval, typically every 15 minutes or when AGPS module 130 requires assistance data, for example when the error tolerance has been exceeded, AGPS Interface Agent 150 retrieves the applicable polynomials, converts them into Orbit State Vector for the current time, converts it back to its equivalent Broadcast Ephemeris Keplerian data format, and injects the resulting Synthetic Assistance data back into AGPS module 130 via the an interface (step 750). This Synthetic Assistance effectively contains a subset of the real Broadcast Ephemeris coefficients, and its ToE (Time of Ephemeris) is configurable, typically set to expire within 15 minutes.

5. AGPS module 130 then first uses the Synthetic Assistance if no valid real Broadcast Ephemeris is available for any given satellite (step 760), but replaces the Synthetic Assistance with real Broadcast Ephemeris as it is ultimately received and demodulated from the RF signal (step 770).

The important elements and features of this invention include, but are not limited to:

A satellite navigation or positioning device, such as GPS device 200, able to autonomously predict and generate its own Assistance Data without requiring external assistance from an external network connection.

GPS device 200 has Seed Generator 110 and Propagator 120 to perform satellite orbit position and velocity predictions.

Seed Generator 110 and orbit Propagator 120 can use orbit prediction models of varying complexity and accuracy depending on the GPS device processor capabilities and application requirements.

A series of satellite positions and an initial velocity are used by Seed Generator 110 to prepare the input to the orbit Propagator 120 in GPS device 200.

If GPS device 200 has external network interface 540, external Assistance Data, whether Real-Time or Synthetic, can optionally be used as input to Seed Generator 110 and orbit Propagator 120.

Network data traffic overhead is reduced or eliminated compared to existing external assistance techniques such as Assisted-GPS.

The system and method according to the invention is applicable for any satellite navigation or positioning system.

The system and method according to the invention is applicable with any type of GPS device/receiver, fixed or mobile.

The system and method according to the invention can be used in a complimentary fashion with GPS and AGPS technologies over any communication network.

Although the particular preferred embodiments of the invention have been disclosed in detail for illustrative purposes, it will be recognized that variations or modifications of the disclosed apparatus lie within the scope of the present invention.

We claim:

1. A method of predicting a location of a satellite, comprising:

receiving, at an RF antenna of a GNSS device, an ephemeris associated with a satellite, the ephemeris valid for an effective time period;

using the ephemeris, the GNSS device calculating position data and velocities of the satellite for a plurality of time intervals over the effective time period;

the GNSS device calculating, at a time during the effective time period, a plurality of correction acceleration terms for reducing errors between predicted position data and predicted velocities of the satellite and ephemeris-derived position data and velocities of the satellite at each of the plurality of time intervals over the effective time period, the predicted position data and predicted velocities being determined using a plurality of previously calculated orbit state vectors stored in memory of the GNSS device;

the GNSS device calculating a current orbit state vector using force model coefficients adjusted based on the plurality of correction acceleration terms and storing the current orbit state vector in the memory, the current orbit state vector being used as initial state for propagating an orbit of the satellite within a predicted time period, at least a portion of the predicted time period occurring after the effective time period; and the GNSS device determining the location of the satellite using the orbit.

2. A method as claimed in claim 1, wherein the GNSS device is a GPS device.

3. A method as claimed in claim 2, wherein when the effective time period has expired, the GPS device determines the location of the satellite using the propagated orbit.

4. A method as claimed in claim 2, wherein during the effective time period, the GPS device determines the location of the satellite using the position data and velocity.

5. A method as claimed in claim 4, wherein the ephemeris is a broadcast ephemeris.

6. A method as claimed in claim 4, wherein the ephemeris is a synthetic ephemeris.

7. A method as claimed in claim 2, wherein the errors between the plurality of predicted position data and the plurality of predicted velocities of the satellite and the plurality of ephemeris-derived position data and velocities of the satellite comprise radial errors and along track errors.

8. A method as claimed in claim 2, wherein the current orbit state vector and orbit state vectors for previous time periods are stored in the memory as polynomials.

9. A method as claimed in claim 8, wherein the polynomial is converted into a synthetic ephemeris by the GPS device in order to determine the location of the satellite.

10. A method as claimed in claim 2, wherein when a network interface of the GPS device is in communication with an AGPS server, the AGPS server providing a synthetic ephemeris to the GPS device when the effective time period has expired.

11. A method as claimed in claim 2, wherein the force model coefficients are calculated iteratively.

12. A method as claimed in claim 2, wherein the GPS device uses a plurality of force models, each force model based on a different set of force model coefficients selected to achieve selected performance characteristics.

13. A method as claimed in claim 12, wherein the selected performance characteristics comprise: computational load, memory requirements, orbital prediction duration and accuracy.

14. A method as claimed in claim 12, wherein the GPS device selects one of the plurality of force models to use when propagating the orbit of the satellite after the effective time period in response to the selected performance characteristics.

15. A method as claimed in claim 12, wherein the GPS device receives the force model correction acceleration terms from a remote server.

16. A method of predicting a location of a satellite, comprising:

a GNSS device propagating an orbit of the satellite using an orbit state vector calculated using a force model, coefficients of the force model being calculated at a time during an effective time period of a broadcast ephemeris received by an RF antenna of the GNSS device, the coefficients being calculated to reduce errors, for a plurality of time intervals over the effective time period of the broadcast ephemeris, between a plurality of ephemeris-derived position data and velocities and a plurality of predicted position data and predicted velocities calculated using a plurality of previously calculated orbit state vectors; and when the effective time period has expired, determining the location of the satellite using the orbit.

17. A method as claimed in claim 16, wherein the GNSS device is a GPS device.

18. A method as claimed in claim 16, wherein the errors comprises radial errors and along track errors.

19. A GNSS device comprising:

an RF receiver for receiving an ephemeris comprising position data and velocities associated with a satellite, the position data and the velocities valid for an effective time period;

a processor for calculating, at a time during the effective time period, ephemeris-derived position data and velocities of the satellite for a plurality of time intervals over the effective time period, calculating a plurality of correction acceleration terms for reducing error between predicted position data and predicted velocities of the satellite and the ephemeris-derived position data and velocities of the satellite at each time interval over the effective time period, the predicted position data and predicted velocities being determined using a plurality of previously calculated orbit state vectors, and calculating a current orbit state vector using force model coefficients adjusted based on the plurality of correction acceleration terms; and a memory for storing the current orbit state vector and previously calculated orbit state vectors;

wherein the current orbit state vector is for propagating an orbit of the satellite within a predicted time period, at least a portion of the predicted time period occurring after the effective time period.

20. A GPS device as claimed in claim 19, wherein the error between the predicted position data and the predicted velocity of the satellite and the position data and the velocity of the satellite comprises radial errors and along track errors.

* * * * *